United States Patent
Booth et al.

(10) Patent No.: US 10,846,152 B2
(45) Date of Patent: Nov. 24, 2020

(54) SECURED MULTI-PROCESS ARCHITECTURE

(71) Applicant: Avigilon Corporation, Vancouver (CA)

(72) Inventors: Daniel James Booth, Vancouver (CA); Thanh Tam Ho, Vancouver (CA); Shaun P. Marlatt, North Vancouver (CA)

(73) Assignee: Avigilon Corporation, Vancouver (CA)

( * ) Notice: Subject to any disclaimer, the term of this patent is extended or adjusted under 35 U.S.C. 154(b) by 0 days.

(21) Appl. No.: 16/564,391

(22) Filed: Sep. 9, 2019

(65) Prior Publication Data

US 2020/0081754 A1 Mar. 12, 2020

Related U.S. Application Data

(60) Provisional application No. 62/729,332, filed on Sep. 10, 2018.

(51) Int. Cl.
| | |
|---|---|
| *G06F 9/44* | (2018.01) |
| *G06F 9/54* | (2006.01) |
| *G06F 7/58* | (2006.01) |
| *G06K 9/00* | (2006.01) |
| *H04L 29/08* | (2006.01) |
| *G06K 9/46* | (2006.01) |

(52) U.S. Cl.
CPC ............. *G06F 9/544* (2013.01); *G06F 7/588* (2013.01); *G06K 9/00711* (2013.01); *G06K 9/46* (2013.01); *H04L 67/104* (2013.01); *G06K 2209/01* (2013.01)

(58) Field of Classification Search
CPC ........................................ G06F 9/544
USPC ........................................................ 719/320
See application file for complete search history.

(56) References Cited

U.S. PATENT DOCUMENTS

| | | | | |
|---|---|---|---|---|
| 6,581,102 B1* | 6/2003 | Amini | ..................... | H04L 29/06 709/231 |
| 7,590,620 B1* | 9/2009 | Pike | ..................... | G06F 11/1482 |
| 9,208,328 B2* | 12/2015 | Russello | ................. | G06F 21/60 |
| 2019/0065293 A1* | 2/2019 | Elsishans | ............... | G06F 9/5016 |

OTHER PUBLICATIONS

The Chromium Project, "The Chromium Projects," archived Sep. 9, 2018, retrieved from the Internet at <http://web.archive.org/web/20180909210839/https://www.chromium.org/>.

* cited by examiner

*Primary Examiner* — Timothy A Mudrick
(74) *Attorney, Agent, or Firm* — Daniel Hammond

(57) ABSTRACT

Methods, systems, infrastructures and techniques for operating a multi-process application are described. The method includes starting a master process and the master process instantiating a first child process and a first inter-process communication (IPC) channel; and instantiating a second child process and a second IPC channel. The method further includes the master process instantiating a third IPC channel used for a direct peer-to-peer (P2P) communication; and providing first and second handles of the third IPC channel to the first and second child processes, using the first and second IPC channels, respectively. The first child process and the second child process can communicate directly using the received first and second handles of the third IPC channel.

22 Claims, 12 Drawing Sheets

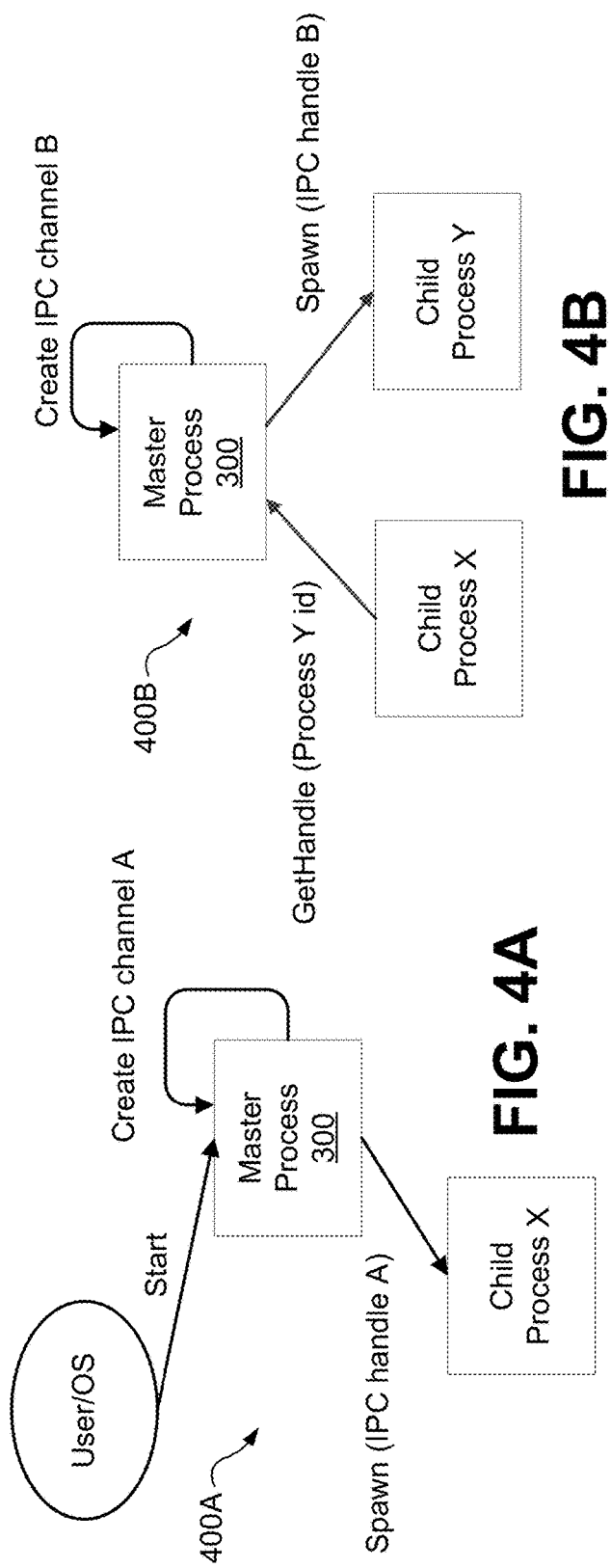
FIG. 4A
FIG. 4B
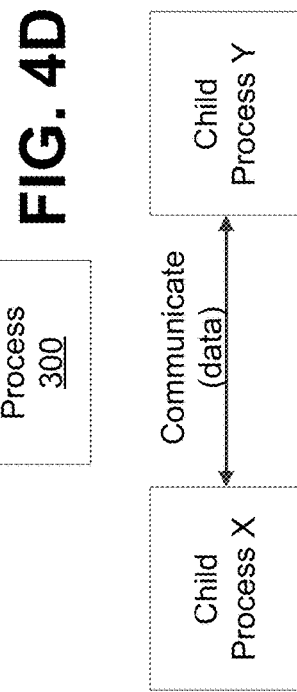
FIG. 4C
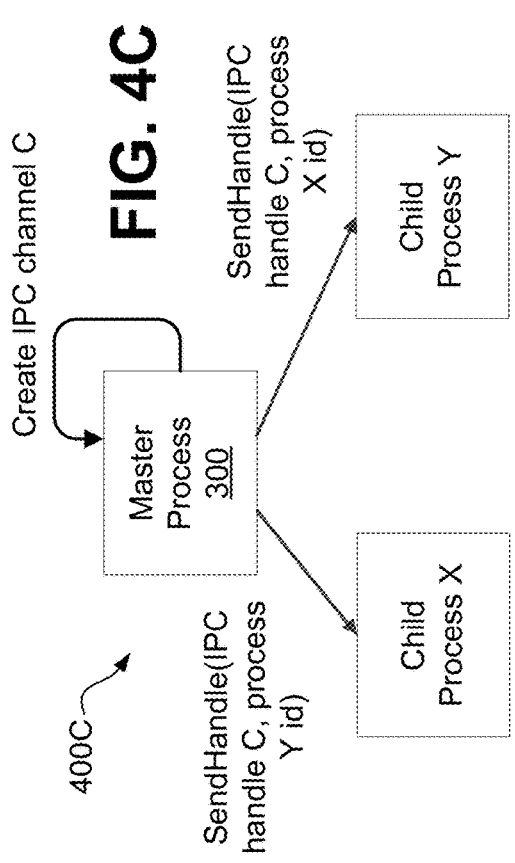
FIG. 4D

SECURED MULTI-PROCESS ARCHITECTURE

CROSS-REFERENCE TO RELATED APPLICATION

This application claims priority to U.S. provisional patent application No. 62/729,332 filed on Sep. 10, 2018, and entitled "Secured Multi-Process Architecture", the entirety of which is hereby incorporated by reference.

FIELD OF INVENTION

The present subject-matter relates to a multi-process architecture and more particularly to a method and system for operating a multi-process application.

BACKGROUND OF THE INVENTION

A large application, such as one used in a video management system, often involves executing several threads performing independent tasks. A monolithic application refers to an application where all functional units or segments run under a single process, while a multi-process application refers to an application where the functional units or segments are divided amongst several processes.

The reliability of any large monolithic application can be defined by the probability that the application performs its intended functions without failing. Assume the probability of any functional segment X of the application succeeding is $P(X)$, therefore the probability of the functional segment failing is $1-P(X)$. If the success/failure of different functional segments are independent events, a monolithic application consisting of functional segments A and B would have a probability of failing $P=1-(P(A) \times P(B))$. Similarly, an application with N independent functional segments $A_1, \ldots, A_N$ would have a probability of failing $P=1-(P(A_1) \times P(A_2) \times \ldots \times P(A_N))$. Thus, when the number of functional segments increases, the probably of failing increases as well.

There are also security constraints on an application performing various tasks. Risks associated with a security compromise can be defined by the probability of the compromise multiplied by the severity of the compromise. The probability of the compromise increases with the increase of the attack surface to the application and is bounded by the weakest component. The severity of the compromise increases with an increase of privileges. The privileges required by a large monolithic application are the union of the privileges required by each individual task the application performs, which can be substantial. As a result, risks can increase nonlinearly as a monolithic application grows in size.

Consequently, as the size of the application increases, the engineering costs can increase significantly in a monolithic application in order to achieve a given reliability and security goal.

Therefore an opportunity exists to provide an infrastructure that can better address the reliability and security needs of operating an application.

SUMMARY OF THE INVENTION

The embodiments described herein provide in one aspect a computer-implemented method for operating a multi-process application. The method includes starting a master process; instantiating, by the master process, a first child process and a first inter-process communication (IPC) channel; instantiating, by the master process, a second child process and a second IPC channel; instantiating, by the master process, a third IPC channel; and providing first and second handles of the third IPC channel to the first and second child processes, using the first and second IPC channels, respectively.

The embodiments described herein provide in another aspect a system for operating a multi-process application, the system comprising a processor and a non-transitory computer-readable storage device storing program instructions that when executed by the processor, cause the system to perform operations. The operations include starting a master process; instantiating, by the master process, a first child process and a first inter-process communication (IPC) channel; instantiating, by the master process, a second child process and a second IPC channel; instantiating, by the master process, a third IPC channel; and providing first and second handles of the third IPC channel to the first and second child processes, using the first and second IPC channels, respectively.

According to some example embodiments, instantiating the first child process includes passing a first handle associated with the first IPC channel to the first child process; and instantiating the second child process includes passing a second handle associated with the second IPC channel to the second child process.

According to some example embodiments, the computer-implemented method further includes requesting, by one of the first and second child processes, a direct peer-to-peer (P2P) communication with the other one of the first and second processes; determining, by the master process, whether the direct P2P communication between the first child process and the second child process is permitted; and when it is determined that the direct P2P communication is permitted: providing the first handle of the third IPC channel to the first child process using the first IPC channel; and providing the second handle of the third IPC channel to the second child process using the second IPC channel.

The embodiments described herein provide in one aspect a computer-implemented method where the first child process and the second child process are configured to communicate directly using the first and second handles of the third IPC channel.

According to some example embodiments, the first child process is configured to perform a first functional segment and the second child process is configured to perform a second functional segment, the first functional segment being different from the second functional segment.

According to some example embodiments, the first child process is configured to receive video data from a video capture device and the second child process is configured to perform artificial intelligence analytics of the received video data.

According to some example embodiments, the first child process is configured to receive video data from a video capture device and the second child process is configured to perform automatic facial recognition using the received video data.

According to some example embodiments, the method is implemented in a video capture and playback system.

According to some example embodiments, the method is operated in a Windows-based operating system. The third IPC channel can be a named pipe, and the method can further include configuring, by the master process, the named pipe in a security setting which allows no access to the named pipe; instructing, by the master process, a kernel of the Windows-based operating system that the first child process is allowed to access the first handle of the named pipe and that the second child process is allowed to access the second handle of the named pipe; and providing, by the master process, first and second handles to the first child process and the second child process, using the first and second IPC channels, respectively. A name of the pipe may be created by a cryptographic random generator.

According to some example embodiments, the method is operated in a Linux-based operating system. The third IPC channel can be a pair of unnamed sockets, and the method can further include creating, by the master process, an initial pair of the unnamed sockets and configuring the sockets in a security setting which allows no access to the sockets; obtaining, by the master process, first and second handles of the pair of the sockets; and duplicating, by the master process, the first handle to a first child process and duplicating, by the master process, the second handle to the second child process.

According to some example embodiments, at least one of the first and second child processes performs security checks, based on information provided by the master process.

According to some example embodiments, the master process, the first child process, and the second child process share a same executable loading a corresponding library.

According to some particular example embodiments, the computer-implemented method includes starting a master process, instantiating, by the master process, a first IPC channel; instantiating, by the master process, a first child process and passing, by the master process, a first handle associated with the first IPC channel to the first child process; instantiating, by the master process, a second IPC channel; instantiating, by the master process, a second child process and passing, by the master process, a second handle associated with the second IPC channel to the second child process; requesting, by one of the first and second child processes, a direct P2P communication with the other one of the first and second processes, using a corresponding one of the first handle associated with the first IPC channel and the second handle associated with the second IPC channel; determining, by the master process, whether the direct P2P communication between the first child process and the second child process is permitted. When it is determined that the direct P2P communication is permitted: instantiating a third IPC channel; providing the first handle of the third IPC channel to the first child process using the first IPC channel; and providing the second handle of the third IPC channel to the second child process using the second IPC channel. The first child process and the second child process are configured to communicate directly using the first and second handles of the third IPC channel.

BRIEF DESCRIPTION OF THE DRAWINGS

These and other features of the invention will become more apparent from the following description in which reference is made to the appended drawings wherein:

FIG. 4A illustrates a flow diagram of a master process creating a first IPC channel A and a first child process X, according to one example embodiment;

FIG. 4B illustrates a flow diagram of the master process creating a second IPC channel B and a second child process Y, and the first child process X requesting a direct P2P communication with the second child process Y, according to one example embodiment;

FIG. 4C illustrates a flow diagram of the master process creating a third IPC channel C and passing two handles of the third IPC channel C to the first and second child processes X and Y, according to one example embodiment;

FIG. 4D illustrates a flow diagram of the first and second child processes X and Y communicating with each other using the third IPC channel C, according to one example embodiment;

Figure 1:
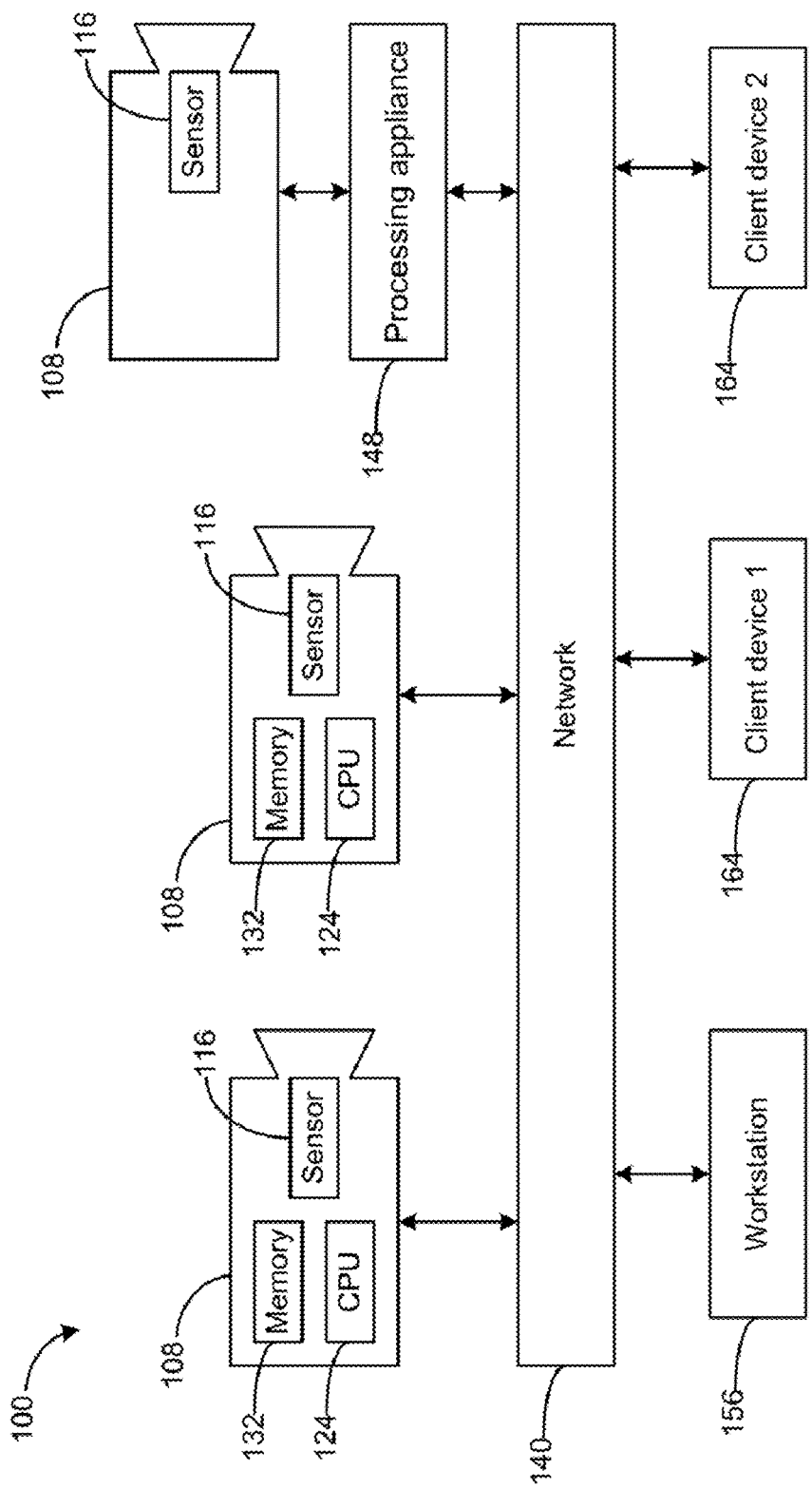
FIG. 1 illustrates a block diagram of connected devices of a video capture and playback system according to an example embodiment.

It will be appreciated that for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context.

Herein, an image may include a plurality of sequential image frames, which together form a video captured by the video capture device. Each image frame may be represented by a matrix of pixels, each pixel having a pixel image value. For example, the pixel image value may be a numerical value on grayscale (ex; 0 to 255) or a plurality of numerical values for colored images. Examples of color spaces used to represent pixel image values in image data include RGB, YUV, CYKM, YCBCR 4:2:2, and YCBCR 4:2:0 images.

"Metadata" or variants thereof herein refers to information obtained by computer-implemented analysis of images including images in video. For example, processing video may include, but is not limited to, image processing operations, analyzing, managing, compressing, encoding, storing, transmitting and/or playing back the video data. Analyzing the video may include segmenting areas of image frames and detecting visual objects, tracking and/or classifying visual objects located within the captured scene represented by the image data. The processing of the image data may also cause additional information regarding the image data or visual objects captured within the images to be output. For example, such additional information is commonly understood as metadata. The metadata may also be used for further processing of the image data, such as drawing bounding boxes around detected objects in the image frames.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the various example embodiments may take the form of a computer program product on a computer-usable storage medium having computer-usable program code embodied in the medium.

Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, therein illustrated is a block diagram of connected devices of a video capture and playback system 100 according to an example embodiment. For example, the video capture and playback system 100 may be used as a video surveillance system. The video capture and playback system 100 includes hardware and software that perform the processes and functions described herein.

The video capture and playback system 100 includes at least one video capture device, or camera 108 being operable to capture a plurality of images and produce image data representing the plurality of captured images. The video capture device or camera 108 is an image capturing device and includes security video cameras.

Each video capture device 108 includes at least one image sensor 116 for capturing a plurality of images. The video capture device 108 may be a digital video camera and the image sensor 116 may output captured light as a digital data.

For example, the image sensor 116 may be a CMOS, NMOS, or CCD. In some embodiments, the video capture device 108 may be an analog camera connected to an encoder.

The at least one image sensor 116 may be operable to capture light in one or more frequency ranges. For example, the at least one image sensor 116 may be operable to capture light in a range that substantially corresponds to the visible light frequency range. In other examples, the at least one image sensor 116 may be operable to capture light outside the visible light range, such as in the infrared and/or ultraviolet range. In other examples, the video capture device 108 may be a multi-sensor camera that includes two or more sensors that are operable to capture light in different frequency ranges.

The at least one video capture device 108 may include a dedicated camera. It will be understood that a dedicated camera herein refers to a camera whose principal feature is to capture images or video. In some example embodiments, the dedicated camera may perform functions associated with the captured images or video, such as but not limited to processing the image data produced by it or by another video capture device 108. For example, the dedicated camera may be a surveillance camera, such as any one of a pan-tilt-zoom camera, dome camera, in-ceiling camera, box camera, and bullet camera.

Additionally, or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes one or more processors 124, one or more memory devices 132 coupled to the processors, and one or more network interfaces. The memory device can include a local memory (such as, for example, a random access memory and a cache memory) employed during execution of program instructions. The processor executes computer program instructions (such as, for example, an operating system and/or application programs), which can be stored in the memory device.

In various embodiments the processor 124 may be implemented by any suitable processing circuit having one or more circuit units, including a digital signal processor (DSP), graphics processing unit (GPU) or video processing unit (VPU) embedded processor, etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device 108 may be implemented together within a system on a chip (SOC). For example, the processor 124, the memory device 116, and the network interface may be implemented within a SOC. Furthermore, when implemented in this way, a general purpose processor and one or more of a GPU and a DSP may be implemented together within the SOC.

Continuing with FIG. 1, each of the at least one video capture device 108 is connected to a network 140. Each video capture device 108 is operable to output image data representing images that it captures and transmit the image data over the network 140.

It will be understood that the network 140 may be any suitable communications network that provides reception and transmission of data. For example, the network 140 may be a local area network, external network (such as, for example, a WAN, or the Internet) or a combination thereof. In other examples, the network 140 may include a cloud network.

In some examples, the video capture and playback system 100 includes a processing appliance 148. The processing appliance 148 is operable to process the image data output by a video capture device 108. The processing appliance 148 also includes one or more processors and one or more memory devices coupled to a processor (CPU). The processing appliance 148 may also include one or more network interfaces. For convenience of illustration, only one processing appliance 148 is shown; however it will be understood that the video capture and playback system 100 may include any suitable number of processing appliances 148.

For example, and as illustrated, the processing appliance 148 is connected to a video capture device 108 which may not have memory 132 or CPU 124 to process image data. The processing appliance 148 may be further connected to the network 140.

According to one exemplary embodiment, and as illustrated in FIG. 1, the video capture and playback system 100 includes at least one workstation 156 (such as, for example, a server), each having one or more processors including graphics processing units (GPUs). The at least one workstation 156 may also include storage memory. The workstation 156 receives image data from at least one video capture device 108 and performs processing of the image data. The workstation 156 may further send commands for managing and/or controlling one or more of the image capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video capture and playback system 100 further includes at least one client device 164 connected to the network 140. The client device 164 is used by one or more users to interact with the video capture and playback system 100. Accordingly, the client device 164 includes at least one display device and at least one user input device (such as, for example, a mouse, keyboard, or touchscreen). The client device 164 is operable to display on its display device a user interface for displaying information, receiving user input, and playing back video. For example, the client device may be any one of a personal computer, laptops, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation 186 and one or more client devices 164.

In some examples, the image capture and playback system 100 may be implemented without the workstation 156. Accordingly, image processing functionalities may be wholly performed on the one or more video capture devices 108. Alternatively, the image processing functionalities may be shared amongst two or more of the video capture devices 108, processing appliance 148 and client devices 164.

Figure 2A:
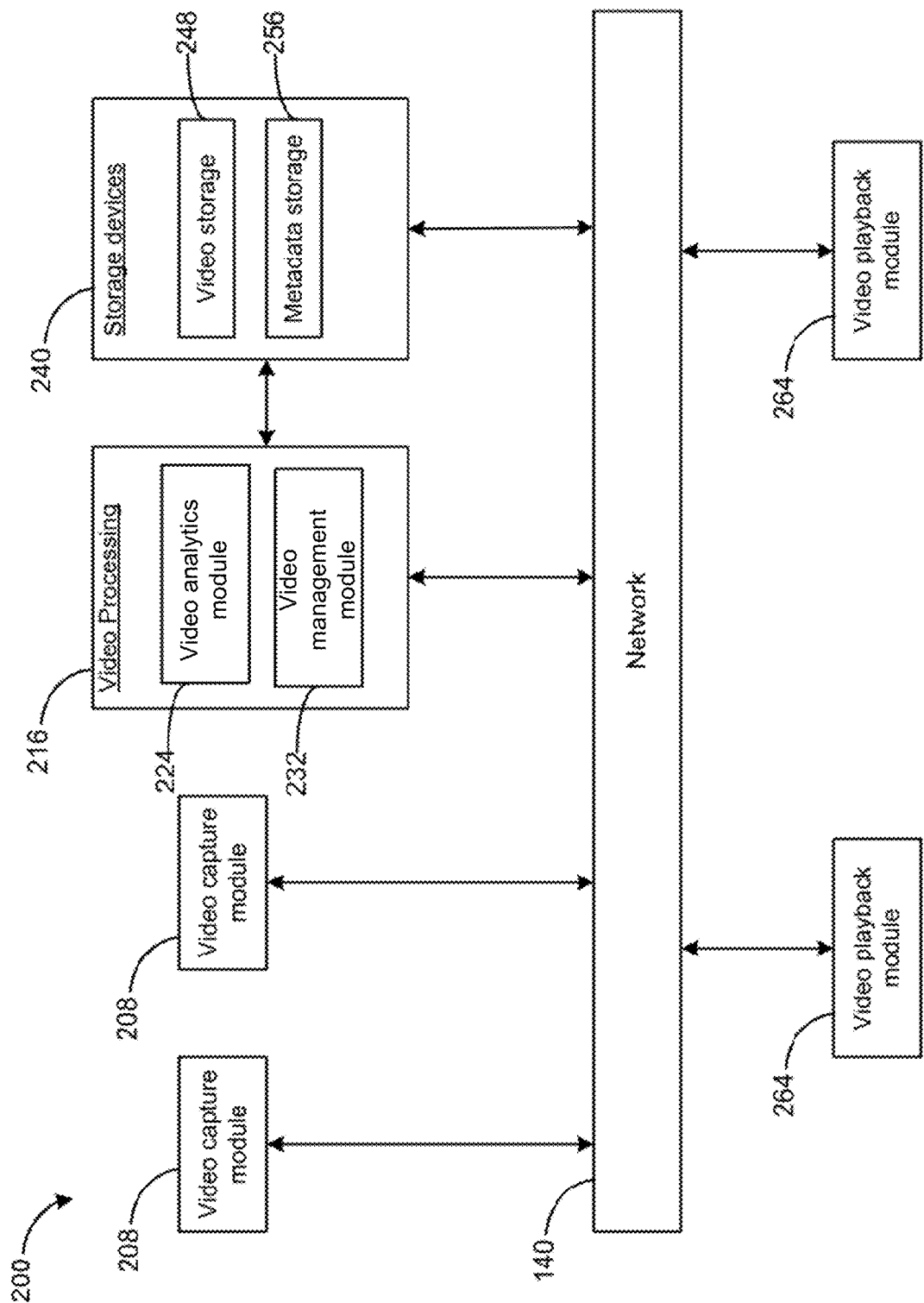
FIG. 2A illustrates a block diagram of a set of operational modules of the video capture and playback system according to one example embodiment.

Referring now to FIG. 2A, therein illustrated is a block diagram of a set 200 of operational modules of the video capture and playback system 100 according to one example embodiment. The operational modules may be implemented in hardware, software or both on one or more of the devices of the video capture and playback system 100 as illustrated in FIG. 1.

The set 200 of operational modules include at least one video capture module 208. For example, each video capture device 108 may implement a video capture module 208. The video capture module 208 is operable to control one or more components (such as, for example, image sensor 116) of a video capture device 108 to capture images.

The set 200 of operational modules includes a subset 216 of image data processing modules. For example, and as illustrated, the subset 216 of image data processing modules includes a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 may further output metadata providing information about the determinations. Examples of determinations made by the video analytics module 224 may include one or more of foreground/background segmentation, object detection, object tracking, object classification, virtual tripwire, anomaly detection, facial detection, facial recognition, license plate recognition, identifying objects "left behind" or "removed", unusual motion detection, object matching and searching, and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management module 232 may also process the image data according to storage capacity within the video capture and playback system 100 for storing image data.

It will be understood that according to some example embodiments, the subset 216 of video processing modules may include only one of the video analytics module 224 and the video management module 232.

The set 200 of operational modules further include a subset 240 of storage modules. For example, and as illustrated, the subset 240 of storage modules include a video storage module 248 and a metadata storage module 256. The video storage module 248 stores image data, which may be image data processed by the video management module. The metadata storage module 256 stores information data output from the video analytics module 224.

It will be understood that while video storage module 248 and metadata storage module 256 are illustrated as separate modules, they may be implemented within a same hardware storage whereby logical rules are implemented to separate stored video from stored metadata. In other example embodiments, the video storage module 248 and/or the metadata storage module 256 may be implemented using hardware storage using a distributed storage scheme.

The set of operational modules further includes at least one video playback module 264, which is operable to receive image data and playback the image data as a video. For example, the video playback module 264 may be implemented on a client device 164.

The operational modules of the set 200 may be implemented on one or more of the image capture device 108, processing appliance 148, workstation 156 and client device 164. In some example embodiments, an operational module may be wholly implemented on a single device. For example, video analytics module 224 may be wholly implemented on the workstation 156. Similarly, video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between one or more of an image capture device 108, processing appliance 148 and workstation 156. Similarly, video management functionalities may be split between one or more of an image capture device 108, processing appliance 148 and workstation 156.

Figure 2B:
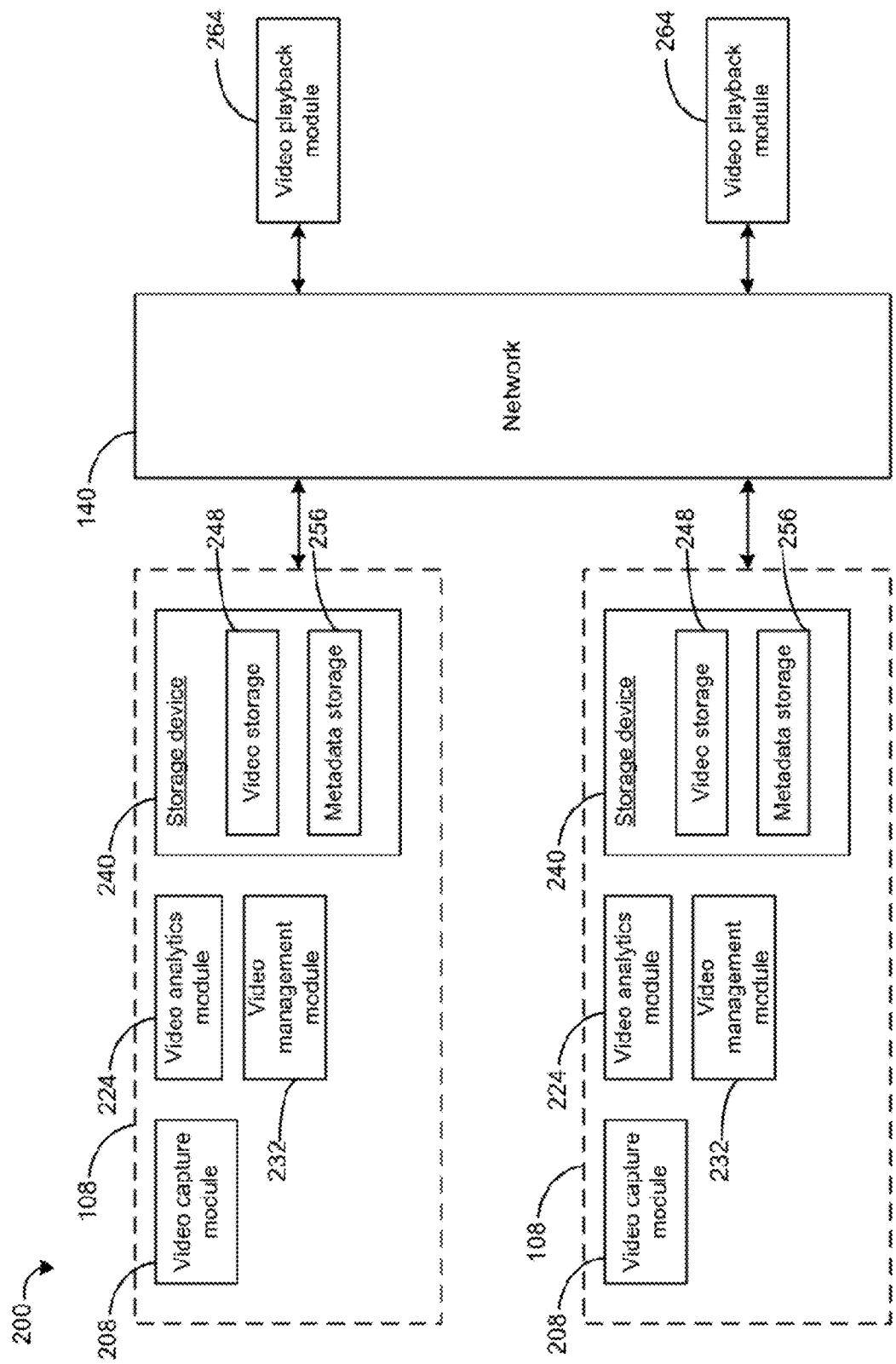
FIG. 2B illustrates a block diagram of a set of operational modules of the video capture and playback system according to one particular example embodiment wherein the video analytics module 224, the video management module 232 and the storage device 240 is wholly implemented on the one or more image capture devices 108.

Referring now to FIG. 2B, therein illustrated is a block diagram of a set 200 of operational modules of the video capture and playback system 100 according to one particular example embodiment wherein the video analytics module 224, the video management module 232 and the storage 240 is wholly implemented on the one or more image capture devices 108. Alternatively, the video analytics module 224, the video management module 232 and the storage 240 is wholly or partially implemented on one or more processing appliances 148.

It will be appreciated that allowing the subset 216 of image data (video) processing modules to be implemented on a single device or on various devices of the video capture and playback system 100 allows flexibility in building the system 100.

For example, one may choose to use a particular device having certain functionalities with another device lacking those functionalities. This may be useful when integrating devices from different parties (such as, for example, manufacturers) or retrofitting an existing video capture and playback system.

For any large and sophisticated system, such as the video capture and playback system 100, the reliability and security of operating the system is particularly important. As the number of the components and modules increases, the probability of failure can increase significantly, particularly when many functional segments run under a single process. Malware or malcode can also exploit and attack sensitive components of the system and access privileged data. With the increase of the size of the system, it is important to keep the engineering costs at a manageable level while achieving a given reliability and security goal.

Described herein includes a multi-process application architecture using a secured inter-process communication (IPC) infrastructure, implemented to improve the reliability and security of the system.

Figure 3:
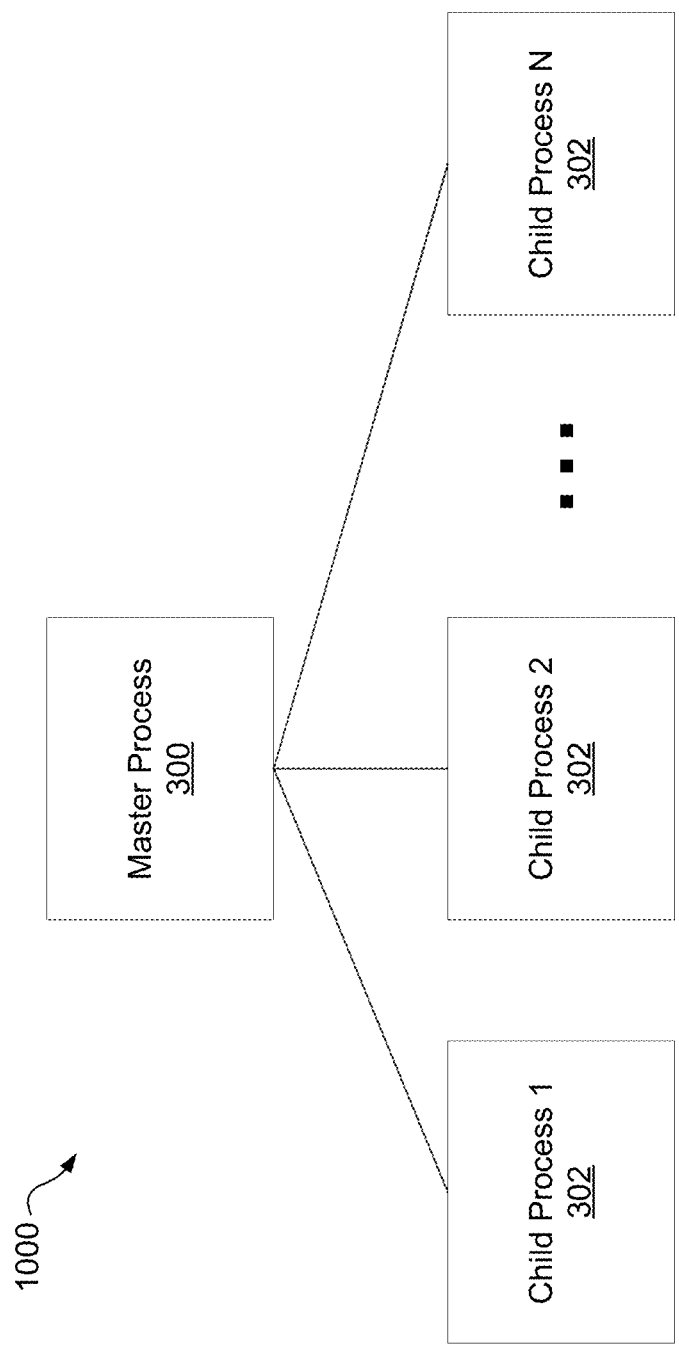
FIG. 3 illustrates a block diagram of a multi-process application architecture, according to one example embodiment.

Referring now to FIG. 3, therein illustrated is a block diagram of a multi-process application architecture 1000 including a master process 300 and N child processes 302, according to one example embodiment.

For the purpose of this disclosure, the phrase "master process" refers to the process running after the boot-up of an application that controls the launch or initiation of all new child processes. The master process may also be referred to as the "parent process".

The master process 300 is configured to load and execute code and instantiate each of the child processes 302. The master process 300 also monitors the child processes 302 so that if any of the child processes 302 fails, the master process 300 can immediately restart or respawn the corresponding child process. In the context of this disclosure, the term "failure" of a process or application refers to an unrecoverable fault resulting in the termination of the process or application. The master process 300 acts as a coordinator to orchestrate the collection of processes that make up the functionality of the application, so that the application can function as one single unit, but with improved security and reliability.

The child processes 302 can perform different roles in the application and have different privileges. By way of an example, one child process can implement the whole or partial functionalities of the video analytics module 224, while another child process can implement the whole or partial functionalities of the video management module 232. As another example, one child process can implement the functionality of facial recognition within the video analytics module 224; and another child process can implement the functionality of license plate recognition within the video analytics module 224.

The master process 300 and the child processes 302 use IPC mechanisms provided by an operating system (OS) to communicate with each other. The master process 300 is the top-level process and it manages the lifetime of the child processes 302 which are lower-level in terms of privileges and access rights. The master process 300 manages communication with and between the child processes 302 and also manages security of all IPCs. In accordance with the example embodiment, the child processes 302 can be configured with minimum privileges and access rights to internal components; and the master process 300 can be designed with limited functionality to minimize its interactions with external elements.

The master process 300 can respawn any failed child process 302 and as a result the failure of one child process 302 does not affect the others. From a development standpoint, the source of failure can be identified and debugged more easily because only the particular failed child process 302 needs to be investigated. Because the master process 300 can be configured to minimize its interactions with external elements, the application can have a significantly reduced chance of failure.

The child processes 302 are assigned with minimum privileges required to function, which significantly reduces the severity of a compromise. Restricting access to resources such as the network or files not needed for the child processes 302 also reduces the attack surface of the application. Separate OS privileges and system context, together with the high-privileged master process with minimal coding, allows the application to be less prone to malicious actors. Even if a low-level child process is compromised, the OS would not be at risk because the compromised child process does not have privileges or access to the OS.

As a result, the multi-process application infrastructure 1000 according to the example embodiment separates the functions of the application and enables process isolation.

It will be understood, in the context of the video capture and playback system 100, the multi-process application can embody any functionality or suitable combinations of functionalities of the operational modules described above. The application may run on a single device, or on multiple devices distributed in the video capture and playback system 100.

It will also be understood that while the multi-process application architecture 1000 may be described with reference to some of the operational modules of the video capture and playback system 100, the multi-process application architecture 1000 is not intended to be limited to the video capture and playback system 100. For example, the multi-process application architecture 1000 can be applied to other systems which include heterogeneous functional segments, where the functional segments differ in the tasks they perform and/or the privileges they have.

The method as described in various example embodiments may be implemented in a Windows-based, Linux-based, Unix-based, or like OS employing a kernel. While the disclosure may be described with reference to certain terminologies known in one particular OS, it will be understood that the multi-process application architecture 1000 is not intended to be limited to that particular OS, unless otherwise stated or suggested by the context.

Referring now to FIG. 4A-4D, there illustrated are flow diagrams 400A-400D of an example embodiment showing the master process 300 establishing IPC channels A, B, C and enabling a direct P2P communication between a first child process X and a second child process Y, according to one example embodiment.

FIG. 4A illustrates a flow diagram 400A of the master process 300 creating a first IPC channel A and the first child process X, according to one example embodiment.

The master process 300 starts when the multi-process application is called upon by either a user of the application or the OS. The master process 300 is configured to instantiate a first IPC channel A and instantiate a first child process X by spawning. The created IPC channel A is a trusted control channel between the master process 300 and the first child process X. Through the spawning command, the master process 300 passes the handle of one end of the IPC channel A to the first child process X as a command line argument.

For the purpose of this disclosure, the term "handle" refers to an abstract indicator used to access a channel. In various OS, there are typically two ends to a channel, often categorized as a client and a server, respectively, where the client is operable to request data and the server is operable to respond to client request. Alternatively, an end of a channel can be both a client and a server, operable to both request and send data. A handle may also be referred to as a "file descriptor"; and a "channel" may also be referred to as a "pipe".

FIG. 4B illustrates a flow diagram 400B of the master process 300 creating a second IPC channel B and the second child process Y, according to one example embodiment.

The master process 300 is further configured to instantiate a second IPC channel B and the second child process Y by spawning, thereby establishing a trusted communication channel with the second child process Y. The IPC channel B is a control channel between the master process 300 and the second child process Y. Through the spawning command, the master process 300 passes the handle of one end of the IPC channel B to the second child process Y as a command line argument.

In one example embodiment, the first child process X is configured to perform a first functional segment and the second child process Y is configured to perform a second functional segment, where the first functional segment is different from the second functional segment. For example, the first child process X may be configured to receive video data from a video capture device; and the second child process Y may be configured to perform artificial intelligence analytics of the received video data. As another example, the first child process may be configured to receive video data from the video capture device and the second child process may be configured to perform automatic facial recognition using the received video data. In accordance with various example embodiments, the master process 300 is configured to enable a direct P2P communication between the two child processes X, Y.

In particular, a child process X, Y, through its control channel A, B, can request its parent 300 for a handle to another peer. The master process 300 checks against the security assertions of the child process X, Y to determine if communication should be allowed between the two peers. If allowed, the master process 300 creates a new IPC channel and passes the handles for the IPC endpoints to the child processes. For example, in the context of the video capture and playback system 100, the child process for receiving video traffic can have access to a video data disk; however, a child process for sending emails cannot have such access.

Referring back to FIG. 4B, the flow diagram 400B further illustrates the first child process X requesting a direct P2P communication with the second child process Y.

In this embodiment, the first child process X sends a request to the master process 300 for a handle to the second child process Y. As illustrated in FIG. 4B, this is performed by the first child process X sending a GetHandle command through the first IPC channel A to the master process 300, using the received handle of the first IPC channel A. The GetHandle command identifies the second child process Y with which the first child process X intends to communicate.

FIG. 4C illustrates a flow diagram 400C of the master process 300 creating a third IPC channel C and passing the handles of the third IPC channel C to the first and second child processes X and Y, according to one example embodiment.

In response to the request for the direct P2P communication between the first and second child processes X, Y, the master process 300 determines whether the communication should be permitted, by checking against the security assertions of the child processes X, Y. If permitted, the master process 300 creates a third IPC channel C. The master process 300 subsequently sends a first handle of the third IPC channel C to the first child process X, and sends a second handle of the third IPC channel C to the second child process Y.

FIG. 4D illustrates a flow diagram 400D of the first and second child processes X, Y communicating with each other using the third IPC channel C, according to one example embodiment.

Once the first and second child processes X, Y obtain the handles of the third IPC channel C, the two child processes X, Y can commence data communication with each other. The master process 300 maintains all necessary privileges that the overall application requires. The master process 300 verifies and spawns child processes X, Y with customized permissions depending on their corresponding roles. The master process 300 also manages the lifetime of the child processes X, Y and establishes P2P communication as requested and verified.

Figure 5:
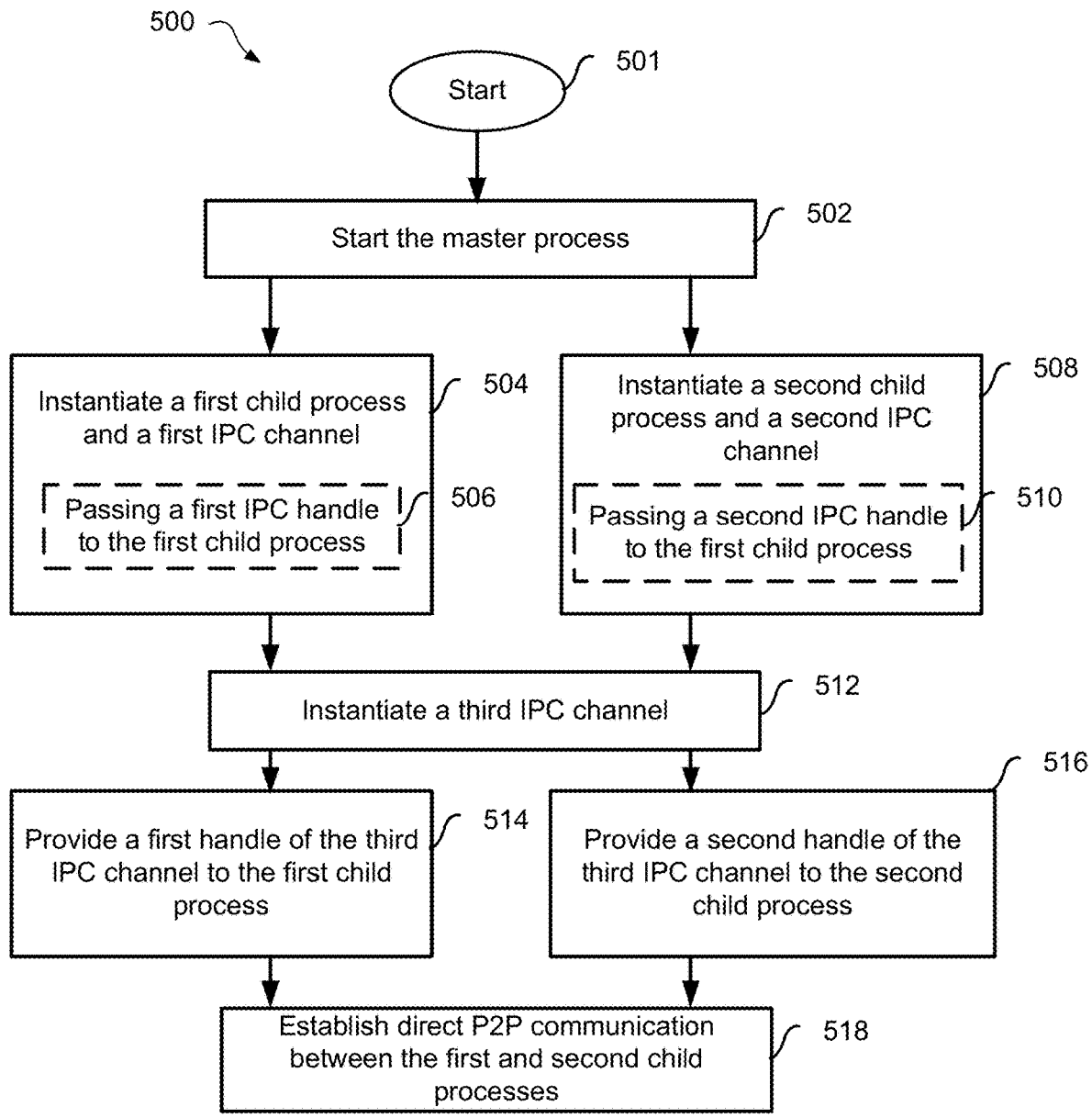
FIG. 5 illustrates a flow diagram of a method of operating a multi-process application, according to an example embodiment.

Referring now to FIG. 5, there illustrated is a flow diagram of a method 500 of operating a multi-process application, according to an example embodiment.

The OS or the user of the application begins performing the method 500 at block 501 and starts the master process at 502. At 504, the master process 300 instantiates a first child process X and a first IPC channel A. Subsequently or concurrently at 508, the master process 300 instantiates a second child process Y and a second IPC channel B. In one example embodiment, instantiating the first child process X includes passing at 506 a first handle associated with the first IPC channel A to the first child process X; and instantiating the second child process Y includes passing at 510 a second handle associated with the second IPC channel B to the second child process Y.

At 512, the master process 300 instantiates a third IPC channel C. This third IPC channel C is used for P2P communication between the first and second child processes X, Y. At 514 and using the established first IPC channel A, the master process 300 provides a first handle of the third IPC channel C to the first child process A. At 516 and using the established second IPC channel B, the master process 300 provides a second handle of the third IPC channel C to the second child process Y. Once the first and second child processes X, Y obtain the handles of the third IPC channel C, a direct P2P communication is established and the two child processes X, Y can commence data communication with each other at 518.

Figure 6:
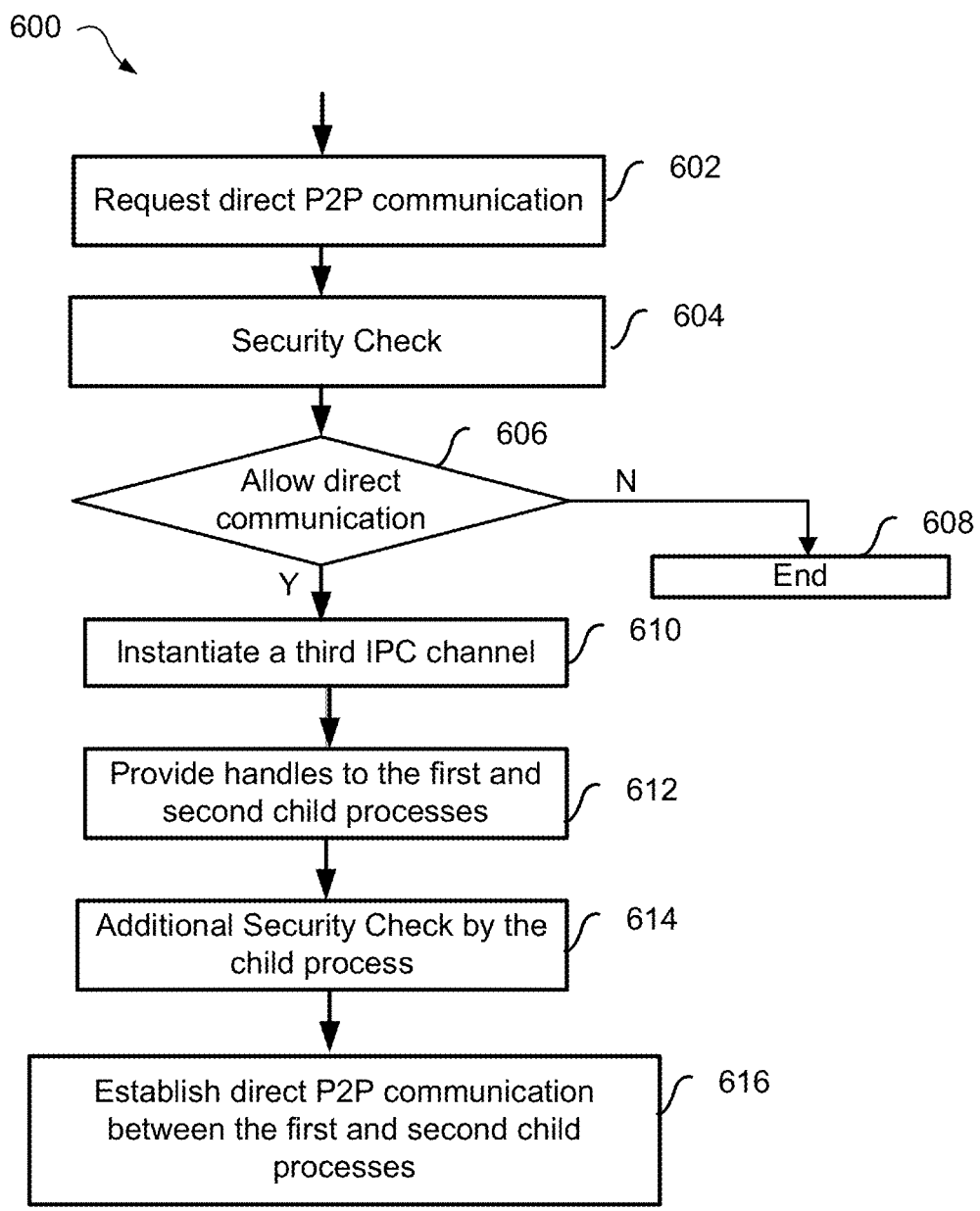
FIG. 6 illustrates the method of FIG. 5, showing detailed operations of instantiating the third IPC channel and establishing the direct P2P communication between the first and second child processes, according to an example embodiment.

FIG. 6 illustrates the method of FIG. 5, showing detailed operations 600 of instantiating the third IPC channel C and establishing the direct P2P communication between the first and second child processes X, Y, according to an example embodiment.

At 602, a request for a direct P2P communication is received by the master process 300. Either one of the first and second child process X, Y can send the request through their respective established control channel A, B. The request identifies the process with which the direct P2P communication is intended and can also identify the type of communication and/or the type of handle of the communication channel.

At 604, the master process 300 determines whether the direct P2P communication between the first and second child processes X, Y should be permitted based on the requested communication and the security assertions associated with the related child processes X, Y. When it is determined that the direct P2P communication is permitted at 606, the master process 300 instantiates the third IPC channel C at 610 and provides handles of the third IPC channel C to the first and second child processes X, Y at 612.

Once the child process X, Y obtains the handle of the third IPC channel C, the child process X, Y can assume that it is communicating to the intended peer as it trusts the master process 300. Alternatively or additionally, either or both of the first and second child processes X, Y may perform additional security or authentication checks at 614, before the direct P2P communication commences. For example, the child process X, Y can check against the handle of the third IPC channel C to confirm that the peer it is going to communicate with is one that is intended and permitted. When passing the handle of the third IPC channel C, the master process 300 can further specify what is allowed to be exchanged through the third IPC channel C and the type of message acceptable by the handle of the third IPC channel C.

Once all security checks pass, at 616, a direct P2P communication is established between the first and second child processes X, Y and the two child processes can exchange data communication.

When it is determined that the direct P2P communication is not permitted at 606, the method ends at 608 and no IPC channel will be created or handle(s) passed to the child process.

Figure 7:
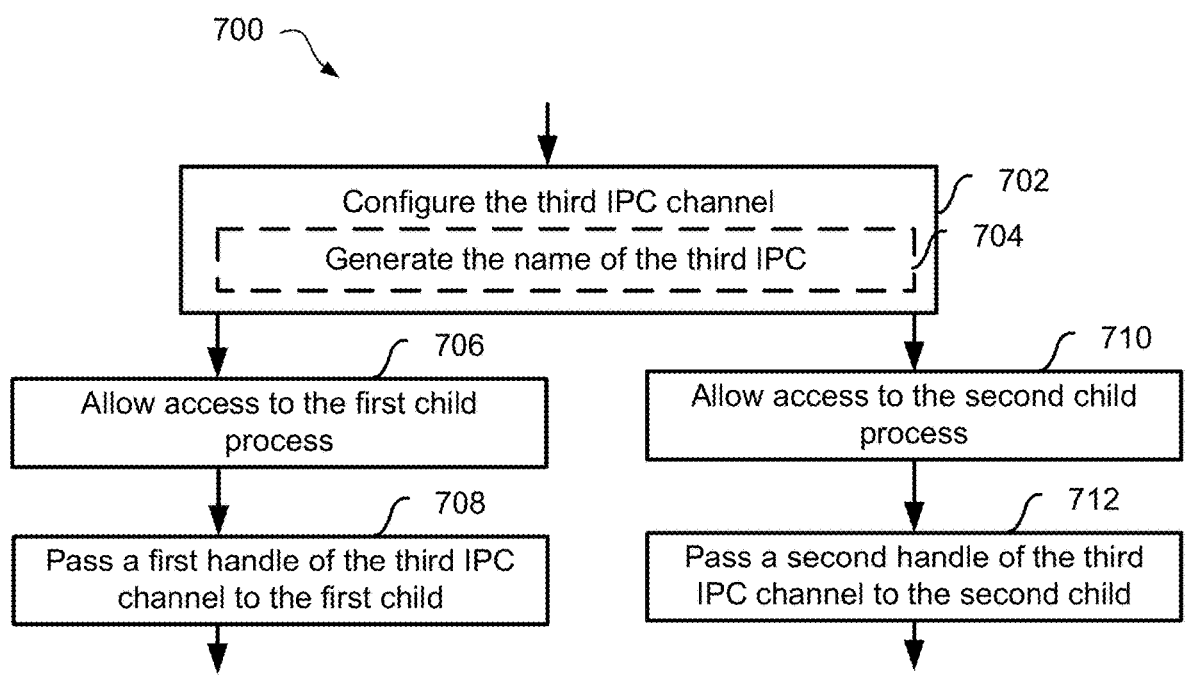
FIG. 7 illustrates a flow diagram of a method of protecting the third IPC channel in a Windows-based operating system, according to an example embodiment.

There are OS-specific kernel level mechanisms that can be employed to protect the direct P2P communication channel. Referring now to FIG. 7, there illustrated is the method 700 of protecting the third IPC channel in a Windows-based OS, according to an example embodiment.

In the Windows-based OS, the third IPC channel can be a named pipe. At 702, the third IPC channel C is created by the master process 300 configuring a named pipe with a security setting which allows no access to the pipe. To deter snoopers and other targeted attacks on the channel, the name of the pipe can be created at 704 by a cryptographic random generator.

At 706, the master process 300 informs the kernel of the Windows-based OS that the first child process X is allowed to access one end of the pipe. This can be done at pipe creation by using the security descriptors of the pipe. Alternatively, the security descriptors can be reconfigured after creation, for example, by calling the SetSecurityInfo( ) function on the pipe. Subsequently at 708, the master process 300 passes the first handle of the pipe to the first child process X as a data stream, using the first IPC channel A.

Subsequently or concurrently with 706, the master process 300 informs the kernel of the Windows-based OS that the second child process Y is allowed to access the other end of the pipe at 710. Subsequently at 712, the master process 300 passes the second handle of the pipe to the second child process Y as a data stream, using the second IPC channel B.

Through the security setting of the named pipe, the third IPC channel C can be configured to allow only the designated peers to connect to it. Any other process that attempts to connect by name would not have access to the channel due to the configured security model. As well, when the pipe name is created by a cryptographic random generator, the pipe name will not be known, identifiable, or predictable by malicious actors.

Figure 8:
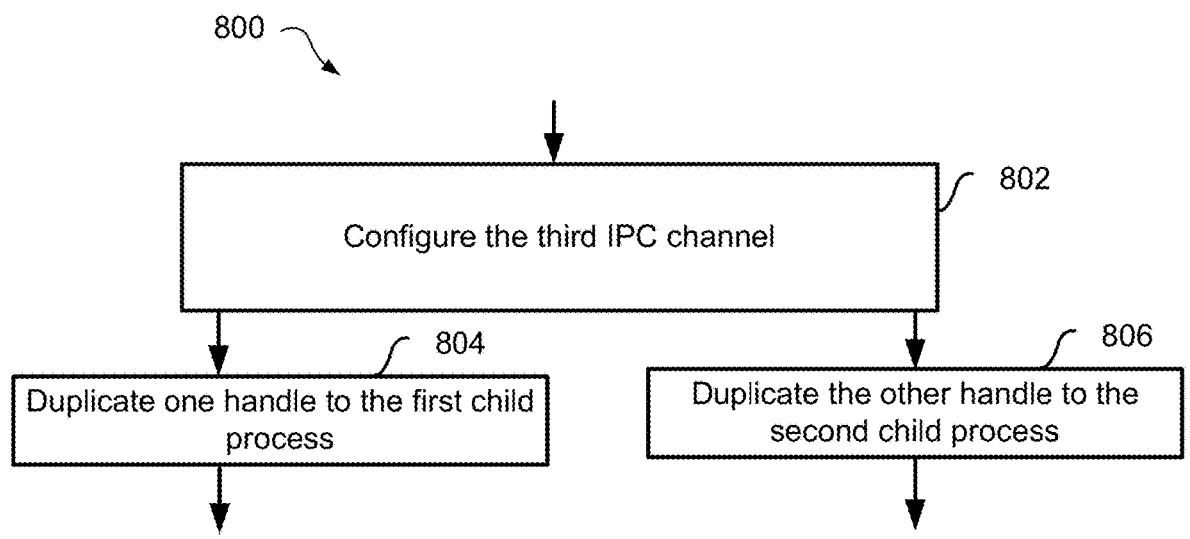
FIG. 8 illustrates a flow diagram of a method of protecting the third IPC channel in a Linux-based operating system, according to an example embodiment.

Referring now to FIG. 8, there illustrated is a method of protecting the third IPC channel in a Linux-based operating system, according to an example embodiment.

In the Linux-based OS, a channel can be a pair of unnamed connected sockets. At 802, the third IPC channel C is instantiated by creating an initial pair of unnamed sockets and configuring them with a security model such that no access is allowed to either end of the socket pair.

At 804, the master process 300 obtains the file descriptors of both ends of the socket pair, and duplicates one file descriptor of one end to the first child process X through fork( ) and exec( ) functions. Subsequently or concurrently at 806, the master process 300 duplicates the other file descriptor of the other end to the second child process Y through fork( ) and exec( ) functions. As a result, the child processes X, Y are able to access the third IPC channel C but no other process is allowed to access the socket pair because of the kernel security model.

In either a Windows-based or Linux-based OS, the channel handle or file descriptor that is passed to the child process is protected by process inheritance to prevent any external actor from reading the child process's spawning command line and stealing the handle. The master process does not trust the child process completely and controls which specific handle is inherited by the child process at the spawning of each process.

Figure 9:
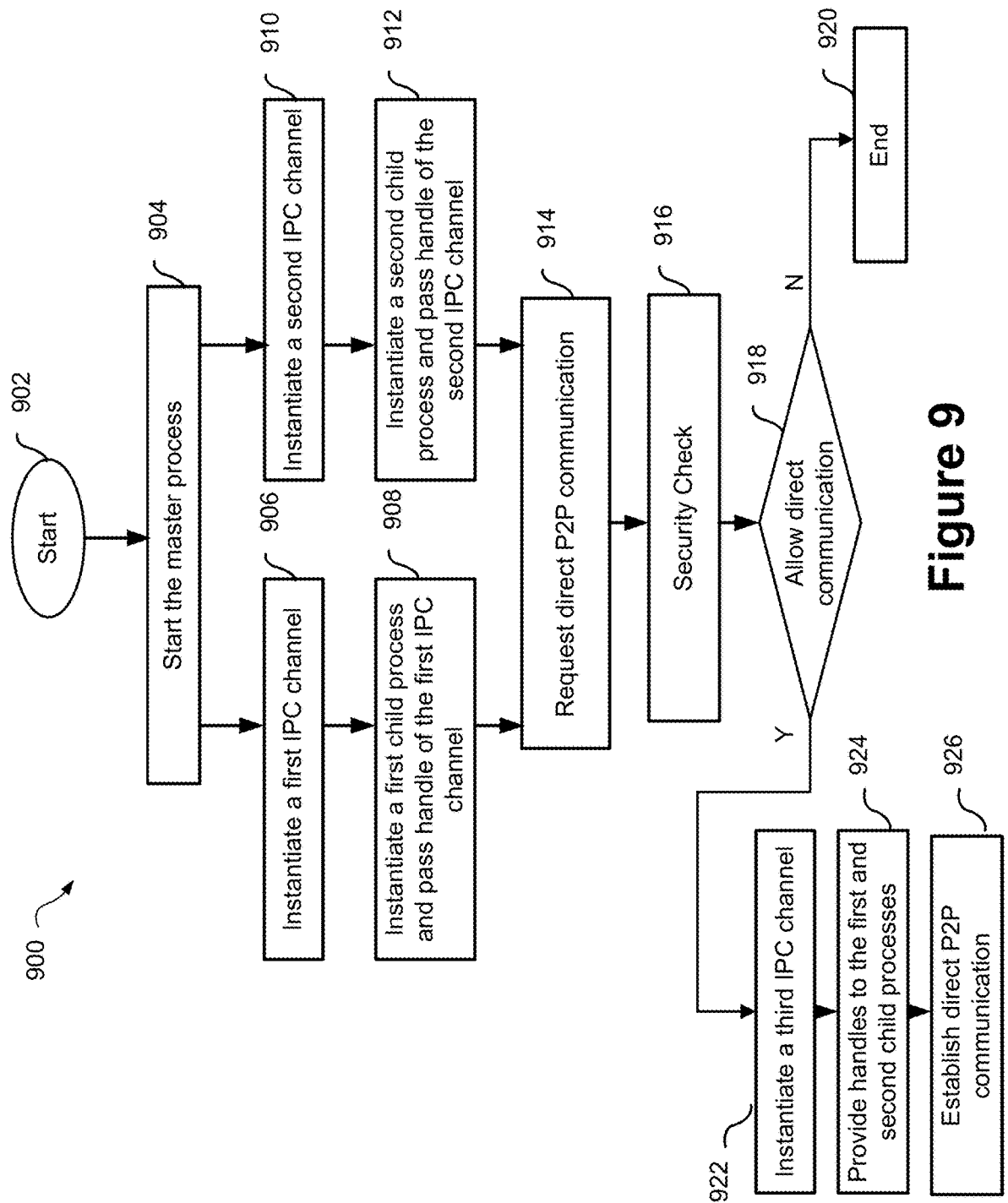
FIG. 9 illustrates a flow diagram of a method of operating a multi-process application, according to one particular example embodiment.

FIG. 9 illustrates a method 900 for operating a multi-process application, according to one particular example embodiment.

Either the OS or a user of the application begins operating the method 900 at block 902 and starts the master process at 904. At 906, the master process 300 instantiates a first IPC channel A. Concurrently or subsequently at 910, the master process 300 instantiates a second IPC channel B. Subsequently to 906, the master process 300 instantiates or spawns a first child process X and passes the handle of the first IPC channel A to the first child process X, at 908. Subsequently to 910, the master process 300 instantiates or spawns a second child process Y and passes the handle of the second IPC channel B to the second child process Y, at 912.

At 914, the master process 300 receives a request for a direct P2P communication. The request can be sent by either the first or the second child process X, Y through the established IPC channel A, B, using a corresponding received handle associated with the IPC channel A, B.

At 916, the master process 300 performs a security check and determines whether the direct P2P communication between the first and second child process X, Y is permitted. When it is determined that the direct P2P communication is permitted at 918, the master process 300 instantiates the third IPC channel C at 922 and provides handles of the third IPC channel C to the first and second child processes X, Y at 924. A direct P2P communication is thereby established between the first child process X and the second child process Y at 926 allowing data communication between the first and second child processes X, Y.

When it is determined that the direct P2P communication is not permitted, the method ends at 920 and no IPC channel will be created or handles passed to the child process.

Figure 10:
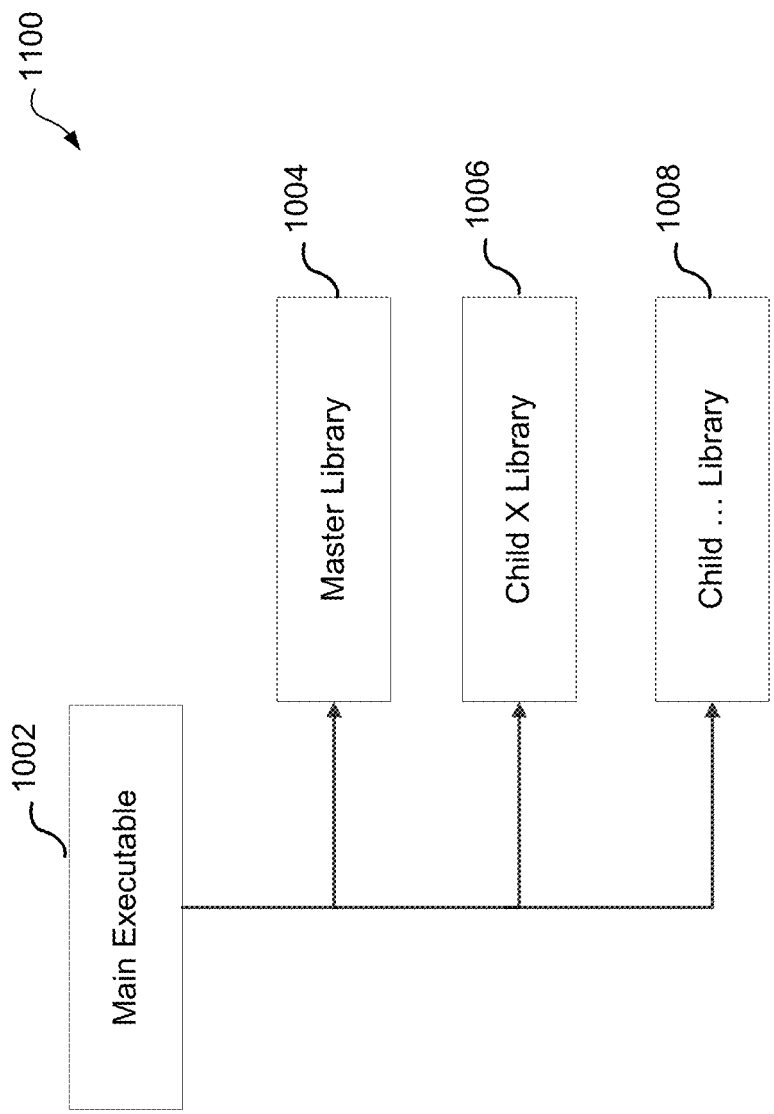
FIG. 10 illustrates a flow diagram of an executable loading the libraries of different processes, according to an example embodiment.

Referring now to FIG. 10, there illustrated is a flow diagram 1100 of an executable loading the libraries of different processes, according to an example embodiment.

In accordance with the example embodiment, the main process 300 and child processes 302 are designed such that the processes share a common executable program. The executable is designed in such a way that it does not perform anything by itself other than to instantiate the process and link to the corresponding library to perform the corresponding function. The same executable can become (or in other words, impersonate) either a master process 300 or a child process 302, depending on the specific library that the executable is linked to. When the process is launched, depending on the library that is called, the process transforms into different roles and becomes different processes.

With reference to FIG. 10, the executable shared amongst the processes is the main executable 1002, and depending on whether it loads the master library 1004, or child X library 1006, 1008, the executable can perform the function of the master process 300, or the function of a corresponding child process 302. The main executable 1002 identifies the appropriate corresponding library, performs necessary security checks, loads the library, and give control to the library's entry point. The entry point of the main executable 1002 will transform into different roles depending on its startup command line arguments. Because the various processes share the same executable, the same firewall rules can apply to all processes, thereby simplifying the firewall rule configuration.

Firewall rulesets are typically based on the exact file path of the application. Using the same executable allows multiple processes to connect to the network using the same set of firewall rules. When the master process 300 spawns a child process 302, the same executable is created but can load a specific library to perform the function.

Figure 11:
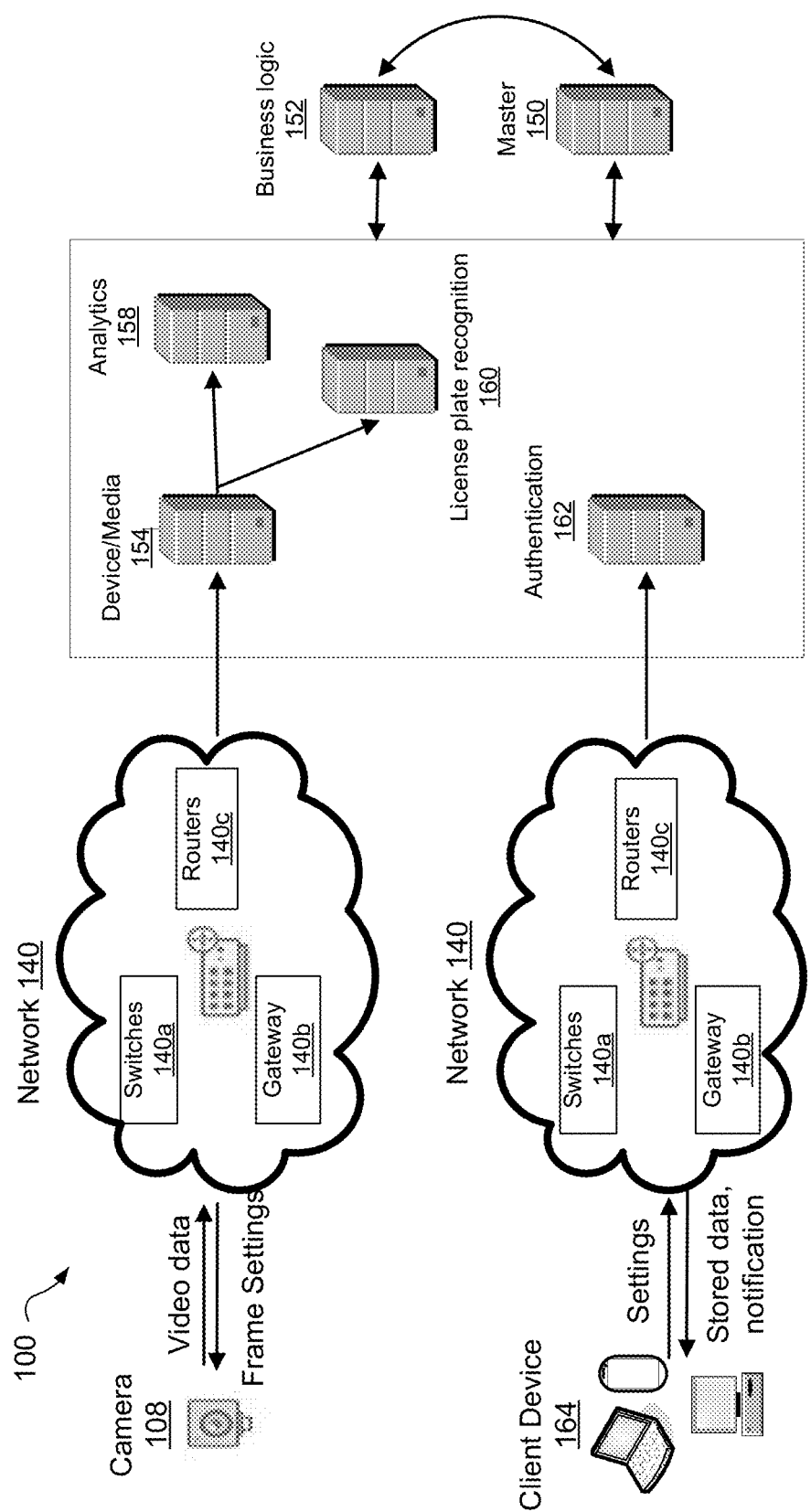
FIG. 11 illustrates a system diagram where the described multi-process infrastructure applies to the video capture and playback system, according to one particular example embodiment.

FIG. 11 illustrates a system diagram where the multi-process infrastructure 1000 applies to the video capture and playback system 100, according to a particular example embodiment.

As described above and with reference to FIG. 11, the video capture and playback system 100 includes at least one video capture device or camera 108, each operable to output captured video data and transmit the video data over the network 140. In turn, the video capture device 108 can receive frame settings for configuration of the video capture device 108.

The video capture and playback system 100 further includes one or more client devices 164 used by one or more users to interact with the video capture and playback system 100. As described above, the client device 164 is operable to receive data and notification from the network 140 and further operable to send customized settings over the network to servers of the video capture and playback system 100. The client device 164 can take the form of any one of a personal computer, laptops, tablet, PDA, cell phone, smart phone, gaming device, and other mobile device.

The network 140 can include a number of network devices, including but not limited to for example, switches 140a, gateways 140b, and routers 140c. The network devices are used to connect the at least one video capture device 108 and the one or more client devices 164 to servers implementing the various functionalities of the video capture and playback system 100. It will be understood and as described above, the network 140 may be any suitable communications network that provides reception and transmission of data.

The video capture and playback system 100 includes a number of servers arranged in any suitable manner implementing the various functionalities. In the particular example embodiment, the video capture and playback system 100 is illustrated to include a master server 150 running the master process 300 for process orchestration, and a business logic server 152 for setting processing rules in association with the other servers. The video capture and playback system 100 further includes a set of servers for performing the various functionalities above. For example, the set of servers can include servers in communication with the video capture device 108 over the network 140, including but not limited to a device/media server 154 for receiving and storing video traffic from the video capture device 108, an analytics server 158 for providing data analytics, and a license plate recognition server 160 for detecting a license plate number. The set of servers can also include ones in communication with the one or more client devices 164, such an authentication server 162 for authenticating the client devices 164.

The multi-process application infrastructure 1000 can apply to one or any suitable collection of the functionalities embodied in the video capture and playback system 100. In this particular example embodiment, the multi-process infrastructure 1000 may be applied to an application that supports local OS processes and performs the whole or partial functionalities of any single server 154, 158, 160, 162. Alternatively, the multi-process application infrastructure 1000 may be applied to perform a set of the functionalities of more than one server 154, 158, 160, 162 connected through a network. It will be understood that the set of servers illustrated in FIG. 11 is shown by way of an example, and the multi-process application infrastructure 1000 is not limited to only the functionalities of these servers or their configurations.

As described above, the master process 300 is responsible for creating, recording, and managing each child process 302. The master process 300 restarts the child processes 302 in cases when they crash, and report problems of the child processes 302. In accordance with the various example embodiments, the master process 300 enables direct P2P communications between the child processes 302 and the child processes can implement various services and functions of the video capture and playback system 100.

For example, in the context of the video capture and playback system 100, a child process X may be a process implemented in the device/media server 154 for receiving and storing video traffic from the video capture device 108. This child process X may be allowed to communicate on a direct P2P basis with a child process Y implemented in the analytics server 158 for performing artificial intelligence analytics of the video data. The child process X may further be allowed to send the video data to a third child process implemented in the license plate recognition server 160 for performing optical character recognition. Alternatively or additionally, the third child process may be allowed to provide the data to another process that applies a rule to that data.

It will be understood that while some embodiments described above are illustrated with two child processes X, Y, the method is applicable to any number of processes. The master process can create N child processes using N corresponding IPC channels for communication with the respective child processes. For each pair of child processes intending to communicate directly, the master process can create an IPC channel and pass the handles of the IPC channel to the pair of child processes.

The master may also act as a directory service which allows a child process to query for the existence of other child processes and then make a request to the master process for an IPC channel that directly connects it to another child process. The master process will only respond to queries and provide IPC channels if it determines that the requested communication is authorized.

The multi-process application infrastructure 1000 as described herein therefore provides the security hierarchies and security guarantees that can improve the overall security and reliability of the system. Using specific mechanisms supported by the OS, the different child processes 302 responsible for different components of the system can be segregated from each other, given appropriate permissions and access, and communicate with each other on a direct P2P basis.

It is contemplated that any part of any aspect or embodiment discussed in this specification can be implemented or combined with any part of any other aspect or embodiment discussed in this specification.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated as non-limiting and it will be understood by persons skilled in the art that other variants and modifications may be made without departing from the scope of the invention as defined in the claims appended hereto. Furthermore, any feature of any of the embodiments described herein may be suitably combined with any other feature of any of the other embodiments described herein.

What is claimed is:

1. A computer-implemented method for operating a multi-process application, the method comprising:
    starting a master process;
    instantiating, by the master process, a first child process and a first inter-process communication (IPC) channel;
    instantiating, by the master process, a second child process and a second IPC channel;
    instantiating, by the master process, a third IPC channel; and
    providing first and second handles of the third IPC channel to the first and second child processes, using the first and second IPC channels, respectively
    requesting, by one of the first and second child processes, a direct peer-to-peer (P2P) communication with the other one of the first and second processes;
    determining, by the master process, whether the direct P2P communication between the first child process and the second child process is permitted; and
    when it is determined that the direct P2P communication is permitted:
    providing the first handle of the third IPC channel to the first child process using the first IPC channel; and
    providing the second handle of the third IPC channel to the second child process using the second IPC channel.

2. The method according to claim 1, wherein instantiating the first child process comprises passing a first handle associated with the first IPC channel to the first child process; and instantiating the second child process comprises passing a second handle associated with the second IPC channel to the second child process.

3. The method according to claim 1, wherein the first child process and the second child process are configured to communicate directly using the first and second handles of the third IPC channel.

4. The method according to claim 1, wherein the first child process is configured to perform a first functional segment and the second child process is configured to perform a second functional segment, the first functional segment being different from the second functional segment.

5. The method according to claim 1, wherein the method is implemented in a video capture and playback system.

6. The method according to claim 5, wherein the first child process is configured to receive video data from a video capture device and the second child process is configured to perform artificial intelligence analytics of the received video data.

7. The method according to claim 5, wherein the first child process is configured to receive video data from a video capture device and the second child process is configured to perform optical character recognition using the received video data.

8. The method according to claim 1, wherein the method is operated in a Windows-based operating system.

9. The method according to claim 8, wherein the third IPC channel is a named pipe, and the method further comprises:
    configuring, by the master process, the named pipe in a security setting which allows no access to the named pipe;
    instructing, by the master process, a kernel of the Windows-based operating system that the first child process is allowed to access the first handle of the named pipe and that the second child process is allowed to access the second handle of the named pipe; and
    providing, by the master process, first and second handles of the pipe to the first and second child processes, using the first and second IPC channels, respectively.

10. The method according to claim 9, wherein a name of the pipe is created by a cryptographic random generator.

11. The method accordingly to claim 1, wherein the method is operated in a Linux-based operating system.

12. The method according to claim 11, wherein the third IPC channel is a pair of unnamed sockets, and the method further comprises:
    creating, by the master process, an initial pair of the unnamed sockets and configuring the sockets in a security setting which allows no access to the sockets,
    obtaining, by the master process, first and second handles of the pair of the sockets; and
    duplicating, by the master process, the first handle to a first child process and duplicating, by the master process, the second handle to the second child process.

13. The method according to claim 3, further comprising at least one of the first and second child processes performing security checks, based on information provided by the master process.

14. The method according to claim 1, wherein the master process, the first child process, and the second child process share a same executable loading a corresponding library.

15. A computer-implemented method for operating a multi-process application, the method comprising:
    starting a master process,
    instantiating, by the master process, a first inter-process communication (IPC) channel;
    instantiating, by the master process, a first child process and passing, by the master process, a first handle associated with the first IPC channel to the first child process;
    instantiating, by the master process, a second IPC channel;
    instantiating, by the master process, a second child process and passing, by the master process, a second handle associated with the second IPC channel to the second child process;

requesting, by one of the first and second child processes, a direct peer-to-peer (P2P) communication with the other one of the first and second processes, using a corresponding one of the first handle associated with the first IPC channel and the second handle associated with the second IPC channel;

determining, by the master process, whether the direct P2P communication between the first child process and the second child process is permitted; and when it is determined that the direct P2P communication is permitted:
  instantiating a third IPC channel;
  providing the first handle of the third IPC channel to the first child process using the first IPC channel; and
  providing the second handle of the third IPC channel to the second child process using the second IPC channel, wherein the first child process and the second child process are configured to communicate directly using the first and second handles of the third IPC channel.

16. The method according to claim 15, wherein the method is operated in a Windows-based operating system.

17. The method according to claim 16, wherein the third IPC channel is a named pipe, and the method further comprises:
  configuring, by the master process, the named pipe in a security setting which allows no access to the named pipe;
  instructing, by the master process, a kernel of the Windows-based operating system that the first child process is allowed to access the first handle of the named pipe and that the second child process is allowed to access the second handle of the named pipe, before providing the first handle of the third IPC channel to the first child process using the first IPC channel and providing the second handle of the third IPC channel to the second child process using the second IPC channel.

18. The method according to claim 17, wherein a name of the pipe is created by a cryptographic random generator.

19. The method accordingly to claim 15, wherein the method is operated in a Linux-based operating system.

20. The method according to claim 19, wherein the third IPC channel is a pair of unnamed sockets, and the method further comprises:
  creating, by the master process, an initial pair of the unnamed sockets and configuring the sockets in a security setting which allows no access to the sockets,
  obtaining, by the master process, the first and second handles of the pair of the sockets; and
  duplicating, by the master process, the first handle to a first child process and duplicating, by the master process, the second handle to the second child process.

21. A system for operating a multi-process application, the system comprising:
  a processor;
  a non-transitory computer readable storage device storing program instructions that when executed by the processor, cause the system to perform a method comprising:
    starting a master process;
    instantiating, by the master process, a first child process and a first inter-process communication (IPC) channel;
    instantiating, by the master process, a second child process and a second IPC channel;
    instantiating, by the master process, a third IPC channel; and
    providing first and second handles of the third IPC channel to the first and second child processes, using the first and second IPC channels, respectively
    requesting, by one of the first and second child processes, a direct peer-to-peer (P2P) communication with the other one of the first and second processes;
    determining, by the master process, whether the direct P2P communication between the first child process and the second child process is permitted; and
    when it is determined that the direct P2P communication is permitted:
      providing the first handle of the third IPC channel to the first child process using the first IPC channel; and
      providing the second handle of the third IPC channel to the second child process using the second IPC channel.

22. A non-transitory computer readable memory recorded thereon computer executable instructions that when executed by a processor perform a method for operating a multi-process application, the method comprising:
  starting a master process;
  instantiating, by the master process, a first child process and a first inter-process communication (IPC) channel;
  instantiating, by the master process, a second child process and a second IPC channel;
  instantiating, by the master process, a third IPC channel; and
  providing first and second handles of the third IPC channel to the first and second child processes, using the first and second IPC channels, respectively
  requesting, by one of the first and second child processes, a direct peer-to-peer (P2P) communication with the other one of the first and second processes;
  determining, by the master process, whether the direct P2P communication between the first child process and the second child process is permitted; and
  when it is determined that the direct P2P communication is permitted:
    providing the first handle of the third IPC channel to the first child process using the first IPC channel; and
    providing the second handle of the third IPC channel to the second child process using the second IPC channel.

* * * * *